United States Patent [19]

Hyman

[11] 3,959,773

[45] May 25, 1976

[54] DISPLAY MEANS AND APPARATUS FOR RECORDING FINANCIAL TRANSACTIONS

[76] Inventor: Ethon Hyman, 634 Elmgate, Glenview, Ill. 60025

[22] Filed: July 13, 1970

[21] Appl. No.: 54,414

[52] U.S. Cl. ............................... 340/172.5; 283/6; 283/57
[51] Int. Cl.² ...................... G06F 3/04; G06F 3/10
[58] Field of Search ............... 340/172.5; 235/157; 197/172; 101/93.01, 426; 283/6, 57–60; 229/92.8

[56] References Cited
UNITED STATES PATENTS

| 528,142 | 10/1894 | Brown | 197/172 |
|---|---|---|---|
| 2,324,662 | 7/1943 | Aaron | 197/172 |
| 2,720,833 | 10/1955 | Lindon | 101/93.01 |
| 3,075,791 | 1/1963 | Wolf | 283/58 |
| 3,308,439 | 3/1967 | Tink et al. | 340/172.5 |
| 3,407,387 | 10/1968 | Looschen et al. | 340/172.5 |

*Primary Examiner*—Mark E. Nusbaum
*Attorney, Agent, or Firm*—Prangley, Dithmar, Vogel, Sandler & Stotland

[57] ABSTRACT

A device which stores information relative to a plurality of accounts and calculates new balances for individual selected accounts upon receipt of information pertaining to a financial transaction to be charged or credited to the selected account and transmits the new calculated information to the point of the transaction, apparatus at the point of transaction responsive to the transmitted information for printing on preassembled first and second forms a visible display of the amount of the transaction and a temporarily concealed display of the amount of the transaction and the selected account balances before and after the transaction.

8 Claims, 4 Drawing Figures

Inventor
ETHON HYMAN

BY

ATTYS.

DISPLAY MEANS AND APPARATUS FOR RECORDING FINANCIAL TRANSACTIONS

This invention relates to apparatus for producing displays of information relating to a financial transaction at the point thereof. More particularly, this invention relates to apparatus for producing an immediately visible display of the amount of the transaction and a temporarily concealed display of the amount thereof and the balance of the account to which the transaction is charged or credited before the transaction and the balance of that account thereafter.

In general, this invention is applicable to any type of financial transaction, a sale being representative thereof but the invention is not limited thereto. Also, financial institutions in general will have use for this invention, banks being but one representative thereof.

In the future, banks will have the balances of their accounts fed into the memory of a central computer storage center, which computer storage center may be linked to many of the retail, wholesale and service business locations by ordinary telephone lines or other means of communication. When this day comes, account cards will be able to be used in lieu of cash or intermediate forms of credit for most commercial transactions, the cards being of the embossed plastic or metal type presently in use. Direct communication between the point of transaction establishment and the financial institution will enable charges directly to be made against a selected account at the time of the particular transaction without the necessity of the costly accounting procedures and intermediate time and expense now required.

Further explanation will be in terms of banks as a financial institution and a sale as a financial transaction, these being representative of broader classifications hereinbefore mentioned.

To facilitate bank account card usage of the type herein described, each participating business will have an input device as well as a read-out device connected as hereinbefore described to the central storage computer. When a customer in a participating mercantile business house has collected the goods he wishes to buy and the cost price of the goods has been totalled by the attendant of the business house, that total will be entered in the computer input device along with the customer's bank card. If the account balance or available credit balance is insufficient to cover the amount of the sale, an appropriate signal from the computer storage center immediately will advise the attendant of this fact, but if the account balance is sufficient to cover the amount of the sale, the sale will be entered directly as a debit against the selected account.

Apparatus for recording sales at a point of sale machine has been described in detail in U.S. Pat. No. 3,335,407 issued Aug. 8, 1967 for APPARATUS FOR RECORDING SALES to Lange et al. This patent describes in detail a machine located at the point of sale which transmits information to a central information-receiving apparatus and in turn receives information from the central information-receiving apparatus. The point of sale machine may be used to print a multiple-copy sales slip of the type now in general use.

Another patent relating to the coaction of a computer storage center with a point of sale or terminal device is U.S. Pat. No. 3,375,500 issued Mar. 26, 1968 for AUTOMATED ACCOUNTING SYSTEMS to Fowler et al., which patent concerns an automated data handling system having a centralized storage and computation center and at least one remote terminal point. The patent discloses means for transmitting information from the terminal point to the centralized storage and computation center in the form of "tone" signals transmitted over ordinary telephone lines.

The devices set out in the above patents describe apparatus for transmitting general information between a centralized computer center and the point of sale, but there is not disclosed therein means responsive to the information received from the centralized computer center for producing an immediately visible display of the amount of the transaction and a temporarily concealed display of the selected account balance before the transaction, the selected account balance after the transaction and the amount of the transaction.

Accordingly, it is the principal object of this invention to provide an apparatus for recording financial transactions comprising means for transmitting information to a computer storage center having data regarding a plurality of accounts and adapted to receive information from a point of transaction device relative to a selected account and to transmit information to the point of transaction device relative to the balance of the selected account before the transaction, the amount of the transaction and the balance of the selected account after the transaction, and means responsive to the information received from the computer storage center relative to the selected account for producing an immediately visible display of the amount of the transaction and a temporarily concealed display of the selected account balance before the transaction, the selected account balance after the transaction and the amount of the transaction.

Another object of the present invention is to provide preassembled first and second forms, the first form having printed thereon the immediately visible display and the second form having printed thereon the temporarily concealed display.

A further object of the present invention is to provide an apparatus of the type set forth in which an impact-producing device is adapted to receive the preassembled first and second forms and to produce thereon the displays in response to information received from the computer storage center.

The invention, both as to its organization and method of operation, together with further objects and advantages thereof, will best be understood by reference to the following specification taken in connection with the accompanying drawings in which.

In general, this invention includes a print-out assembly in a two form configuration wherein the top sheet shows an immediately visible display and the bottom sheet has printed thereon a temporarily concealed display. Once the transaction or sale has been entered against the selected account, the read-out device will print out the following information in two parts:

1. (visible to the check-out attendant)
    a. The amount of the sale entered against the account;
2. (visible only to the purchaser)
    a. The balance in the account prior to the present sale;
    b. The amount of the present sale; and
    c. The balance in the account after the sale.

Figure 1:
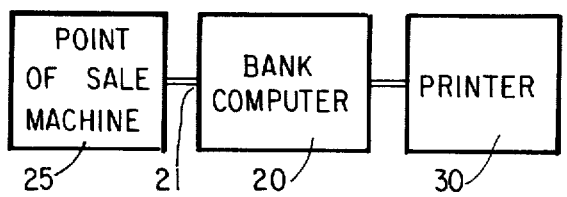
FIG. 1 is a block diagram illustrating the inner relationship of the various devices which make up the apparatus of the present invention.

With reference particularly to FIG. 1, there is illustrated a system including for purposes of illustration but not being limited thereto a central bank computer 20 coupled through communication links 21 to a point of sale machine 25 and a printer 30 which may be mechanisms such as are disclosed in the above mentioned Lange et al. U.S. Pat. No. 3,335,407 modified as hereinafter described. The communication links 21 may be ordinary telephone lines and the point of sale machine 25 and the printer 30 may be in the same location and may be contained in a single housing as in the above mentioned Lange et al. patent. The central bank computer 20, which may be an International Business Machines Corporation Series No. 370, Model No. 155 computer, for example, includes a memory system containing information regarding a plurality of bank accounts, the accounts each being identifiable by number. The owner of each account has a bank card which may be of the plastic embossed type now commonly in use, such as the card shown in FIG. 14 of the above identified Lange et al. patent, the card having a number thereon corresponding to the identification number of his account, whereby the use of an individual bank card in a point of sale machine 25 will result in certain accounting operations being made to the corresponding selected account retained in the memory of the bank computer 20.

Figure 2:
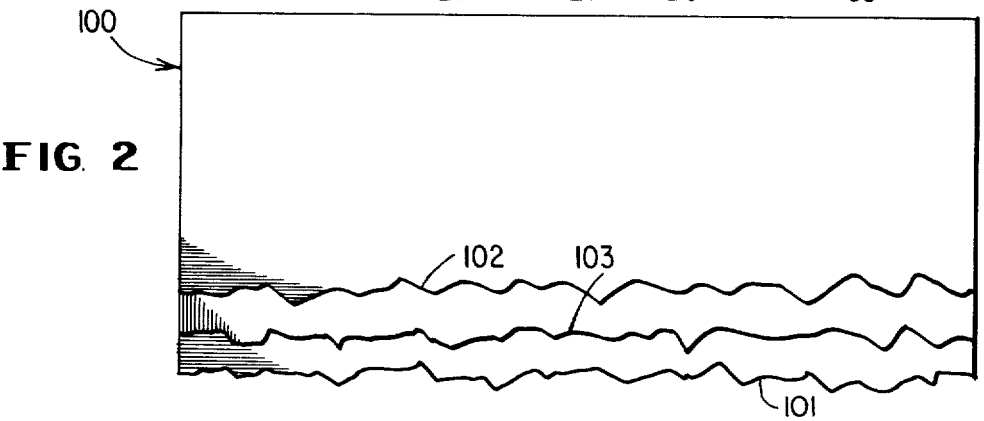
FIG. 2 is a fragmentary plan view of the back face of a bank card statement showing the preassembled relationship thereof.
Figure 3:
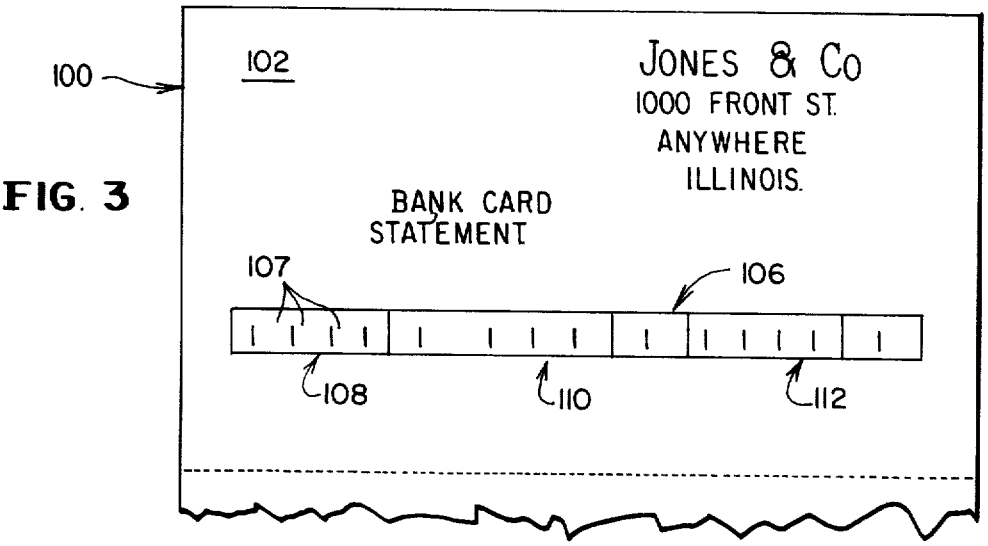
FIG. 3 is a fragmentary plan view of the front face of the bank card statement of FIG. 2 particularly showing the temporarily concealed display thereof.

FIGS. 2 and 3 show the rear and front faces respectively of a bank card statement 100, the statement 100 including a first form 101 and a second form 102 assembled in a predetermined relation and arranged to overlie one another. The first form 101 and the second form 102 have associated therewith means 103 for producing a temporarily concealed display on the front face of the second form 102, all as hereinafter described. Generally, the means 103 may consist of a sheet of carbon paper interposed between the first form 101 and the second form 102 or a backing of carbon carrying material firmly adhered to the rear face of the first form 101. Another embodiment of the means 103 is a plurality of ink-filled pressure-rupturable capsules carried by the front face of the second form 102. Whichever of the above-described means 103 is used, impact on the front face of the first form 101 produces a temporarily concealed display on the front face of form 102 when the forms 101 and 102 are in their preassembled relations one to the other.

The front face of the second form 102 of the bank card statement 100 carries, as particularly shown in FIG. 3, the name and address 103 of the business house, the business house identification preferably being placed in the upper right-hand corner of the form 102 of the bank card statement 100. As shown, there is a horizontal row 106 positioned in the approximate center of form 102 on the front face thereof, the horizontal row 106 being comprised of a plurality of individual columns 107. The columns 107 are in abutting side-by-side relationship and are formed into three sections 108, 110, and 112. Section 108, the left-handmost section as seen in FIG. 3, contains seven columns 107 for listing the balances of the bank account prior to the charge thereagainst of the cost price of the merchandise forming the basis for the transaction or sale. The center section 110 contains six columns 107 for showing the amount of the particular transaction or sale and the right-handmost section 112 contains seven columns for showing the balance of the selected account after the sale has been charged to the selected account and subtracted from the balance shown in section 108. As may be appreciated, the exact number of columns 107 in each of the sections 108, 110 and 112 is arbitrary and subject to change to fit the particular needs of any given business establishment; however, the grouping herein shown provides for displays of bank account balances up to and including $99,999.99, whereas the six columns 107 in section 110 permit displays of a sale price up to and including $9,999.99.

Figure 4:
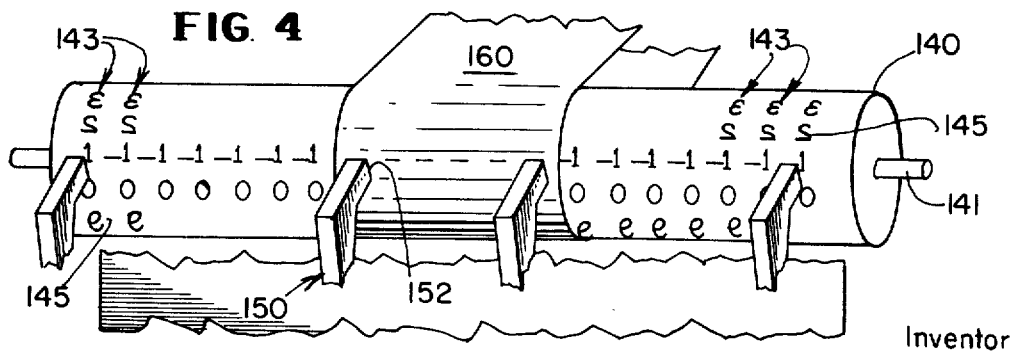
FIG. 4 is a perspective view of a print-out mechanism.

The printer 30, a portion of which is shown in perspective in FIG. 4, except as hereinafter pointed out, may have essentially the same structure as the printer 3556 shown in the above identified Lange et al. U.S. Pat. No. 3,335,407. That printer is illustrated in FIG. 41 through 47 of the said Lange et al. patent and is described in the portion of the specification of that patent beginning in line 44 of column 50 thereof and continuing through line 47 in column 51.

The printer 30 includes a roller 140 corresponding to the type wheel 3592 of Lange et al. which roller is securely fixed to and rotatable with a shaft 141 corresponding to the shaft 3594 of Lange et al. and supported by a housing, not shown. The roller 140 carries 20 rows of digits axially spaced therealong, corresponding to columns of type 3620 on the wheel 3592. The rows of digits 143 correspond in number to the columns 107 on the bank card statement 100.

Each of the rows 143 comprises 10 digits 145 evenly spaced circumferentially around the periphery of the roller 140, the digits 145 being consecutive integers arranged from 0 to 9 consecutively. The arrangement of the sets of consecutive digits corresponds generally to the rows 3618 in Lange et al. as may be seen. The shaft 141 is connected to a gear arrangement (not shown) corresponding to 3596 in Lange et al. which as in that patent provides for stepwise rotation of the roller 140, thereby to present a different numeral or digit 145 in printing relationship to the bank card statement 100 for each incremental rotation of the roller 140.

A plurality of hammers 150, corresponding to the hammers 3602 of Lange et al., are associated with the roller 140, each of the hammers 150 being in alignment with one of the rows 143 also as in Lange et al. Each of the hammers 150 is pivotally mounted on a transverse rod (not shown) which corresponds to rod 3606 of Lange et al. and thus has its axis parallel to the axis of shaft 141, and each hammer 150 is provided with an impact producing end 152, corresponding to 3604 of Lange et al., adapted to contact a digit 145 of the corresponding row 143.

There is further provided an inked ribbon 160 corresponding to the ribbon 3590 of Lange et al. but differing therefrom in that it is disposed between a selected group of hammers 150 and the corresponding rows 143 of digits 145 on the roller 140 instead of between all the hammers and all of the coresponding rows of digits. The inked ribbon 160 is of predetermined length lengthwise of the roller and is axially positioned so as to cover only those rows 143 which are used to provide the immediately visible display on the bank card 100. In the preferred embodiment, the inked ribbon 160 is of sufficient width to cover the six columns 107 which form the center section 110 and the ribbon 160 is axially so placed, thereby to produce upon activation of the associated hammers 150 an immediately visible display showing the total sales price for the merchandise or services purchased.

The actual printing operation is performed when a bank card statement 100 is properly placed in the printer 30 between the roller 140 and the hammer 150 so as to have the front face of form 101 corresponding to the section 110 of form 102 facing the inked ribbon 160. In response to a signal from the bank computer 20, the roller 140 is incrementally rotated in a series of 10 steps in an operation corresponding to that of the device disclosed in the above identified Lange et al. patent with the appropriate hammers 150 being activated in response to the information from the computer 20 to form both the immediately visible display on the front face of form 101 and the temporarily concealed display on the front face of form 102. When the hammers 150 strike the front face of form 101 in an area thereon corresponding to sections 108 and 112 on form 102, no visible image is produced on the front face of form 101, but a permanent image is produced in response to the impact on the front face of form 102 due to the presence of the means 103 associated with the preassembled forms 101 and 102. The rows 143 and the associated hammers 150 which correspond to the columns 107 forming sections 108 and 112 respectively are responsive to information from the computer 20 regarding the balance of the selected account prior to the sale and the balance of the selected account after the sale, and since this information is confidential, it forms a part of the temporarily concealed display printed on the face of form 102 but does not appear on the face of form 101 and is not part of the immediate display thereon.

The hammers 150 which strike the rows 143 corresponding to the columns 107 of the center section 110 produce both an immediately visible display on the face of form 101 and a temporarily concealed display on the face of form 102. The immediately visible display on the front face of form 101 is printed thereon due to the position of the preassembled bank card statement 100 being interposed between the inked ribbon 160 and the roller 140 with the ribbon 160 being axially positioned to cover the areas defined by section 110. Actuation of the hammers 150 in alignment with the rows 143 forming the columns 107 of section 110 results in contact of the impact-producing end 152 of the hammer 150 with the inked ribbon 160 thereby to produce a printed image on the front face of the form 101 corresponding to the digit 145 which is in printing position at the time the associated hammer 150 is activated. Simultaneously with the production of the immediately visible display on the front face of form 101, there is also produced a corresponding temporarily concealed display on the front face of form 102 due to the coaction of the associated hammer 150, the digit 145, the preassembled forms 101 and 102 and the means 103 associated therewith, the temporarily concealed display being formed by the same mechanism as hereinbefore described with respect to sections 108 and 112.

Recapitulating, the attendant of a business house calculates the total cost of the goods or services purchased by the customer. When the customer tenders to the attendant his identifying bank account card, the attendant inserts the amount of the purchase and the bank account card into the point of sale machine 25, which machine 25 transmits the information inserted thereinto to the bank computer 20. The computer 20 selects the appropriate selected bank account by the identification number carried on the bank card and transmits the following information to the point of sale machine 25: (a) the balance of the selected account before subtracting the purchase therefrom; (b) the total purchase price of this transaction; and (c) the balance of the selected account after having the total purchase price subtracted therefrom.

The printer 30 operates in response to the information received from the bank computer 20 to activate the appropriate hammers 150 as the roller 140 is incrementally turned to produce an immediately visible display of the purchase price of this transaction on the front face of form 101 in an area corresponding to section 110 on the front face of form 102 and a temporarily concealed display on the front face of form 102, the temporarily concealed display being permanent in form and setting forth the information contained in (a) to (c) above. Since forms 101 and 102 in their preassembled relation overlie one another, the attendant will have immediate visible access only to the immediately visible display on the front face of form 101, whereas the information contained on the front face of form 102 is concealed from the attendant. Thereafter, the attendant may separate the forms 101 and 102 from their preassembled relation and retain the form 101 as a permanent record of the sale for the business house and give the form 102 to the purchaser as a permanent record of the sale.

In order to guarantee that the attendant does not see the confidential information on form 102, the statement 100 may comprise an assembly of two forms 101 and a form 102 preassembled so that removal of one of the forms 101 leaves a second form 101 over the form 102. The attendant will in this case present the purchaser with the assembled combination of form 101 and form 102. It is clear that a plurality of forms 101 and 102 may be preassembled depending on the required end-use thereof, some financial institutions requiring more copies than others, and therefore the invention herein is not limited to any specific number of preassembled forms 101 and 102.

It is clear that the herein described system is adaptable to provide both immediately visible information and temporarily concealed information, the extent and content of each type of information being a matter of choice to be determined by the characteristics of the situation. It is seen, however, that in the preferred embodiment there has been described herein an apparatus for recording sales including a computer storage center having information regarding a plurality of accounts and adapted to receive sales information from a point of sale device relative to a selected account and to transmit information to the point of sale device relative to the balance of the selected account before the sale, the amount of the sale and the balance of the selected account after the sale, and means responsive to the information received from the computer storage center relative to the selected account for producing an immediately visible display of the amount of the sale and a temporarily concealed display of the selected account balance before the sale, the selected account balance after the sale and the amount of the sale.

What is claimed is:

1. Apparatus for recording financial transactions comprising means for transmitting information to a computer storage center having data regarding a plurality of accounts and adapted to receive information from a point of transaction device relative to a selected account and to transmit information to the point of transaction device relative to the balance of the selected account before the transaction, the amount of the transaction and the balance of the selected account after the transaction, means including a first form and a second form assembled so that said first form overlies and temporarily conceals a face of said second form, and means responsive to the information received from the computer storage center relative to the selected account for producing on the first of said so assembled forms an immediately visible display of the amount of the transaction and on the said temporarily concealed face of said second form a temporarily concealed display of the amount of the transaction and for producing only on said temporarily concealed face of said second form a temporarily concealed display of the selected account balance before the transaction and of the selected account balance after the transaction, said means responsive to the information received from the computer storage center including a plurality of impacting devices and an ink-carrying member intermediate only some of said impacting devices and a portion of said first of said so assembled forms to produce an immediately visible display on the portion of said first form by the impact of some of said devices against said ink-carrying member and to produce the temporarily concealed display on said second of so assembled forms by the impact of all of said devices on said first form, whereby activation of said impacting devices in response to information from the computer storage center produces visible information on said portion of said first form in registry with said ink-carrying member and produces visible information on said second form over an area greater than said portion of said first form.

2. The apparatus of claim 1, wherein said visible display and said temporarily concealed display are produced in permanent form.

3. The apparatus of claim 1, wherein said means including said first and second forms also includes means therebetween for producing the temporarily concealed display on said second form.

4. The apparatus of claim 3, wherein said means for producing the display on said second form is a carbon backing on said first form.

5. The apparatus of claim 3, wherein said means for producing the display on said second form is carbon paper interposed between said first and second forms.

6. The apparatus of claim 3, wherein said means for producing the display on said second form includes pressure-rupturable ink-filled capsules embedded in the front face of said second form.

7. The apparatus as described in claim 1 which includes an ink-carrying member adapted to overlie a portion of said first form of said assembled first and second forms, whereby operation of said impact producing device in response to information received from the computer storage center produces both an immediately visible display and a temporarily concealed display where said impact producing device impacts said ink-carrying member and produces a temporarily concealed display where said impact producing device impacts said first form.

8. The apparatus of claim 7, wherein the displays are produced in a single horizontal row having the amount of the sale in the center thereof and the account balance before the sale to one side of the amount of the sale and the account balance after the sale to the other side of the amount of the sale, the ink-carrying member being positioned to overlie the center of the horizontal row to produce the immediately visible display thereat.

* * * * *